(12) United States Patent
Smith (10) Patent No.: US 9,587,368 B2
(45) Date of Patent: Mar. 7, 2017

(54) MANHOLE REPAIR BRACKET (71) Applicant: Robert T. Smith, Reynoldsburg, OH (US)

(72) Inventor: Robert T. Smith, Reynoldsburg, OH (US)

( * ) Notice: Subject to any disclaimer, the term of this patent is extended or adjusted under 35 U.S.C. 154(b) by 0 days.

(21) Appl. No.: 14/677,150

(22) Filed: Apr. 2, 2015

(65) Prior Publication Data
US 2016/0289912 A1   Oct. 6, 2016

(51) Int. Cl.
*E02D 29/14* (2006.01)
*E02D 29/12* (2006.01)
*F16B 5/02* (2006.01)

(52) U.S. Cl.
CPC ............ *E02D 29/128* (2013.01); *E02D 29/14* (2013.01); *E02D 29/1481* (2013.01); *F16B 5/02* (2013.01)

(58) Field of Classification Search
CPC ............................... E02D 29/14; E02D 29/128
USPC ...................................................... 404/25, 26
See application file for complete search history.

(56) References Cited

U.S. PATENT DOCUMENTS

| | | | | |
|---|---|---|---|---|
| 3,218,943 A | * | 11/1965 | Bowman | E02D 29/1409 220/3.7 |
| 3,773,428 A | * | 11/1973 | Bowman | E02D 29/1409 404/26 |
| 4,867,601 A | * | 9/1989 | Bowman | E02D 29/14 404/26 |
| 4,872,780 A | * | 10/1989 | Bowman | E02D 29/14 404/26 |
| 4,925,337 A | * | 5/1990 | Spiess | E02D 29/1409 404/25 |
| 4,969,771 A | * | 11/1990 | Bowman | E02D 29/14 404/26 |
| 4,976,568 A | * | 12/1990 | Hess | E02D 29/1409 404/25 |
| 5,165,819 A | * | 11/1992 | Bowman | E02D 29/14 404/26 |
| 5,184,912 A | * | 2/1993 | Bowman | E02D 29/14 404/25 |
| 5,205,668 A | * | 4/1993 | Adams | E02D 29/14 404/26 |
| 5,316,407 A | * | 5/1994 | Miller | E02D 29/14 404/25 |
| 5,797,221 A | * | 8/1998 | Young | E02D 29/14 404/25 |

(Continued)

*Primary Examiner* — Thomas B Will
*Assistant Examiner* — Katherine Chu
(74) *Attorney, Agent, or Firm* — Frank H. Foster; Kremblas & Foster (57) ABSTRACT

A repair bracket that provides a substitute for one or more broken anchoring tabs of a manhole base. The repair bracket is an expansible bracket that has a frame member with a central manhole access passage through the frame member. The frame member has threaded holes transversely through the frame member and located at positions corresponding to positions of threaded holes in the original unbroken anchoring tabs of the manhole base. The threaded holes are used to connect the frame member to a manhole cover by threaded bolts extending through the cover and into the threaded holes. Expansible actuators are mounted to the frame member and are capable of moving a part of the expansible bracket outward into engagement against the inner wall of the base or a sleeve or casing attached to the base.

20 Claims, 6 Drawing Sheets

(56) References Cited

U.S. PATENT DOCUMENTS

| | | | | |
|---|---|---|---|---|
| 5,878,448 A * | 3/1999 | Molter | ............... | E03F 5/0408 |
| | | | | 4/288 |
| 5,974,741 A * | 11/1999 | Fukuhara | ............ | E02D 29/1409 |
| | | | | 404/25 |
| 6,371,688 B1 * | 4/2002 | Yang | ............... | E02D 29/1409 |
| | | | | 404/26 |
| 6,997,639 B2 * | 2/2006 | Nadasde | ............ | E02D 29/1445 |
| | | | | 404/26 |
| 7,263,746 B2 * | 9/2007 | Neuhaus | ............... | F16L 5/02 |
| | | | | 24/279 |

* cited by examiner

MANHOLE REPAIR BRACKET

CROSS-REFERENCES TO RELATED APPLICATIONS (Not Applicable)

STATEMENT REGARDING FEDERALLY-SPONSORED RESEARCH AND DEVELOPMENT (Not Applicable)

THE NAMES OF THE PARTIES TO A JOINT RESEARCH AGREEMENT (Not Applicable)

REFERENCE TO AN APPENDIX (Not Applicable)

BACKGROUND OF THE INVENTION

This invention relates to manholes of the type used to protect and limit access to underground chambers or vaults and more particularly relates to a bracket that provides a prosthetic repair appliance that allows a considerably quicker, easier and less expensive repair of a manhole base with a broken cover anchoring tab by providing a substitute for the broken anchoring tab.

Manholes are commonly found in many places and are known by a variety of names including maintenance hole and access hole. A manhole is the top, usually vertical and cylindrical passage to an underground chamber or vault. The chamber or vault houses an access point for making connections, performing maintenance or accessing an underground material or device for measurement purposes.

Referring to FIGS. 1-4, typically the top opening into the manhole is surrounded by a base 10 with a central opening 12 and an outwardly extending flange 14. The base 10 supports a cover 16 for inhibiting unauthorized access and/or preventing entry of surface liquids and other surface materials into the manhole. The manhole cover 16 is supported on the base 10 usually on a mating surrounding recessed ledge 18 that is formed to receive the cover 16 so that the top of the cover 16 is in the same horizontal plane as the top of the base 10 and the cover 16 is confined against lateral horizontal movement on the base 10. The base 10 and cover 16 are usually made of cast iron but some are made of precast concrete, glass reinforced plastic or other materials. The base 10 and its cover 16 are often installed over a manhole in a paved area so that the top of the base flange 14 and the top of the cover 16 are level with the surface of the pavement or surrounding grout.

Around the inner wall 20 of the base 10 there is usually a lip, flange or shoulder (herein referred to as a lip 22) which protrudes inwardly and surrounds the inner wall 20 of the base 10 and is in a plane parallel to the top surface of the base. Most commonly, the upper (in the installed orientation) surface of the lip 22 is offset below the top of the base to form the recessed ledge 18 that supports the cover 16. However, the lip 22 can be formed separately and independently of the recessed ledge 18 and, although not preferred, an embodiment of the invention can be used even in the absence of a lip. The underside of the lip 22 has a downward facing surface 24 which is important because that surface 24 can engage preferred embodiments of the invention for reasons that subsequently will be described.

Most manholes are cylindrical with a circular base and cover for a variety of reasons including that the circular shape prevents the manhole cover from falling into the manhole. However, there are also square and rectangular manholes, with correspondingly shaped bases, covers and lips. The invention is also applicable to those manholes as well as manholes of other shapes.

Figures 1, 2:
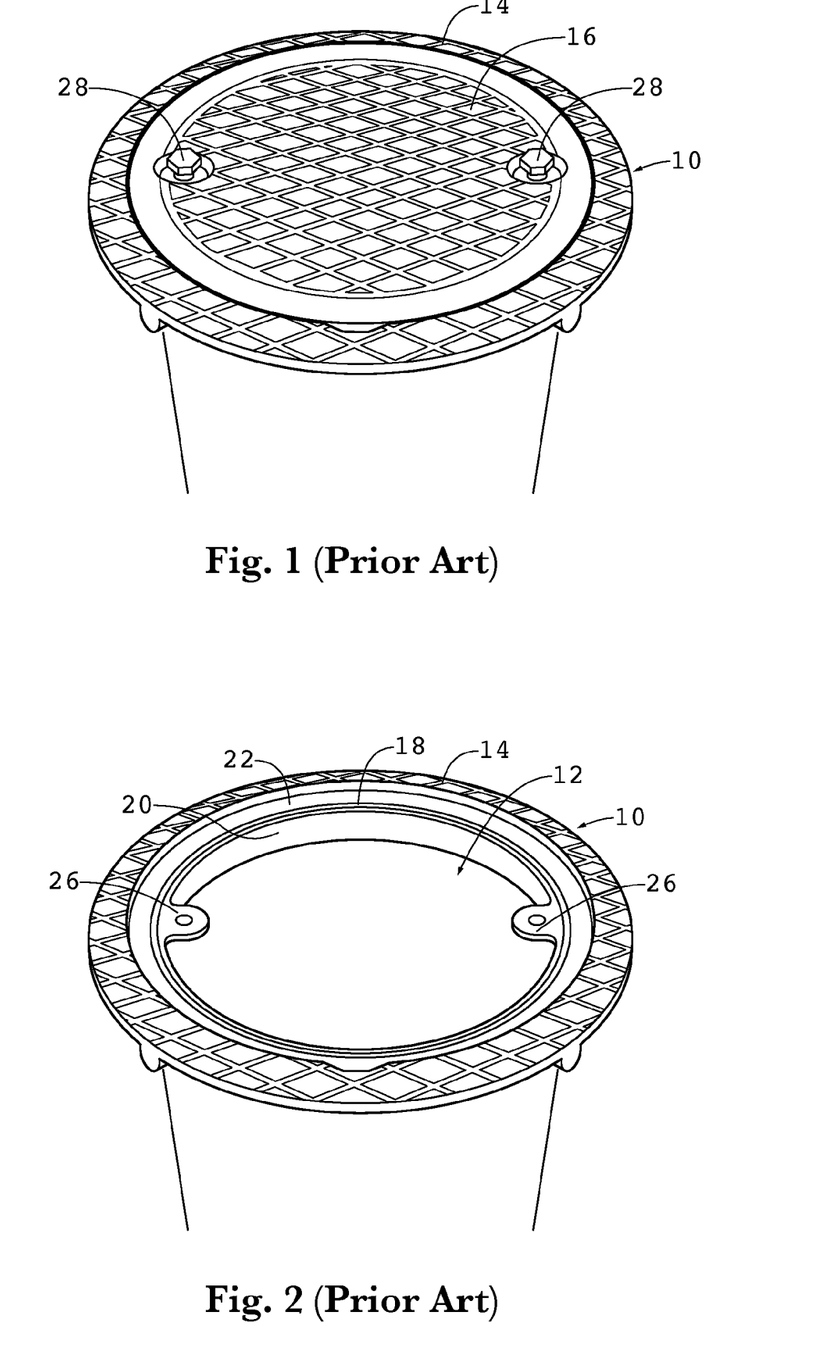
FIG. 1 is a view in perspective of a manhole base and cover as known in the prior art.
FIG. 2 is a view in perspective of a manhole base as known in the prior art and with the cover removed.
Figure 3:
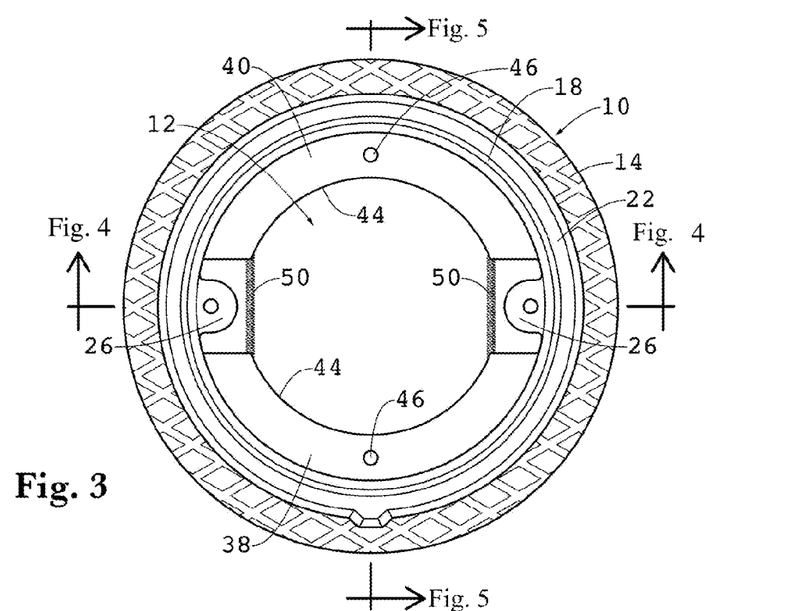
FIG. 3 is a top plan view of a manhole base with an embodiment of the invention installed in it.

A manhole base 10 typically has anchoring tabs 26 for attachment of the manhole cover 16 to the base 10 by means of threaded bolts 28. The tabs 26 are usually cast integrally with the base 10 and protrude inwardly from the inner wall 20 of the base 10 and often from the lip 22. For circular manhole bases there most commonly are two diametrically opposite tabs although there can also be three or more tabs spaced around a circular inner wall. For square, rectangular or triangular manhole bases there may be a tab on each side or just on two sides. The anchoring tabs 26 have tapped holes 30 so they have female threads to permit the cover 16 to be attached to the base 10 with the threaded bolts 28. The threaded bolts 28 extend through countersunk holes in the cover 16 and into the tapped holes 30 to bolt down the cover 16 onto the base 10.

Figure 4:
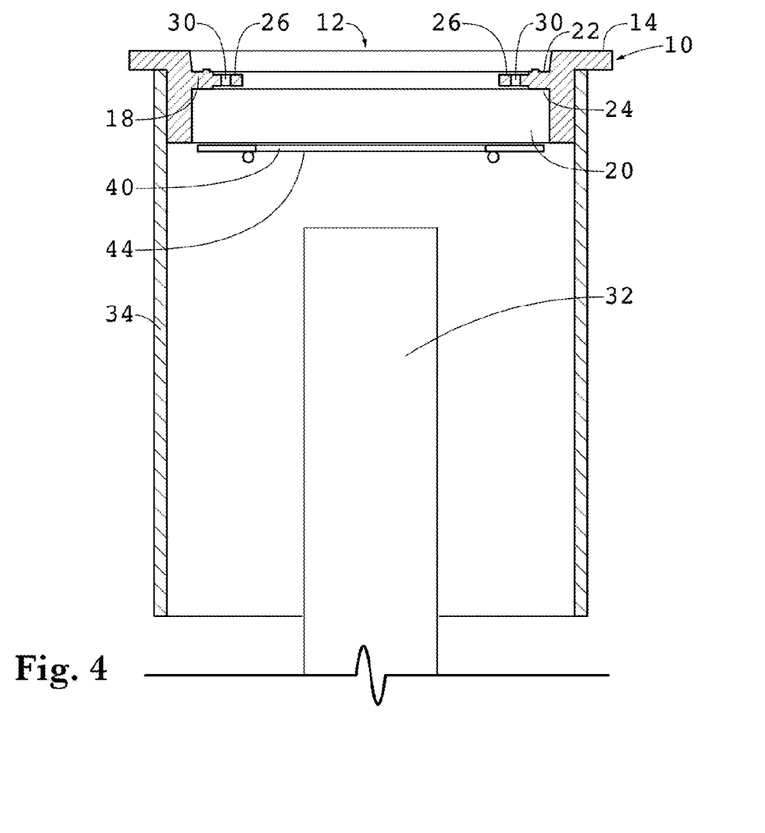
FIG. 4 is a view in vertical section taken substantially along the line 4-4 of FIG. 3.
Figure 5:
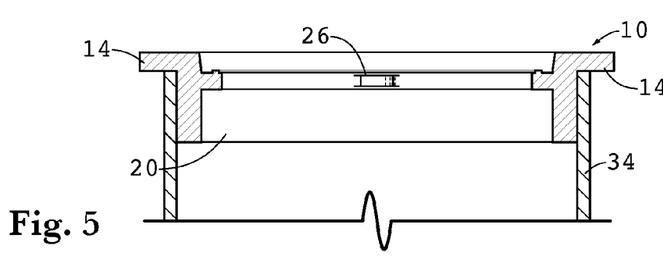
FIG. 5 is a view in vertical section illustrating only the prior art base of FIGS. 1 and 2 and taken substantially along the line 5-5 of FIG. 3.

Referring to FIG. 4, an example of a manhole for which the invention is well suited is a manhole that houses a well 32 of smaller exterior diameter than the inner diameter of the base 10. The top end of the well 32 terminates below the level of the base and the bottom end of the well 32 terminates in an underground earth-walled chamber. Wells of this type are used for sampling ground water such as in the soil beneath or adjacent underground fuel tanks that are buried below the pavement at gas stations. However, the invention is suitable for use on other manholes such as common street manholes for accessing sewers and utility underground passageways.

Manholes of various types also usually have a casing or sleeve 34 of material to prevent the surrounding earth from eroding into the manhole. For example, a manhole of the type described above has a cylindrical metal sleeve 34 that seats against a cylindrical surface of the manhole base 10.

There is, however, a problem with manhole bases and the invention greatly alleviates that problem. The materials from which manhole bases are fabricated, such as cast iron, are relatively brittle and break under tension forces, especially at very low temperatures. Consequently, the cover anchoring tabs often break off from the base. For example, dirt or sand can support parts of the cover above the recessed ledge and act as a fulcrum. An automobile tire running over an unsupported part of the cover can cause the cover to act as a lever that applies an excessive upward force through a cover bolt to its tab. Another cause of tab breakage is snow plow blades striking the cover.

If both tabs become broken, the cover is no longer secured to the base and therefore is more easily removed, such as by vandalism, which permits unauthorized access and the entry of surface contaminants. If only one of the tabs is broken, the cover becomes loose and noisily tilts when driven over by a vehicle tire.

The current manner of repairing the broken cover anchoring tabs is to replace the entire base. Base replacement requires a repair crew to dig up the concrete or grout that immediately surrounds the base, lift out the base and replace it with a new base. Then new concrete or grout must be poured around the base and permitted to harden. This repair requires not only the purchase of a new base but also several man-hours to complete. A repair of this type additionally requires a time delay after the repair is completed and during which time the manhole site must be blocked from vehicle traffic while the concrete or grout hardens.

It is therefore an object and feature of the invention to provide a prosthetic repair appliance that is less costly than a new manhole base, requires far fewer man-hours for completion of a repair, and allows the manhole to be returned to normal use immediately after the repair is completed.

BRIEF SUMMARY OF THE INVENTION

The invention is a repair bracket for providing a substitute for one or more broken anchoring tabs of a manhole base. The repair bracket is an expansible bracket that has a frame member with a central manhole access passage through the frame member that permits access into the manhole. The frame member has threaded holes transversely through the frame member and located at positions corresponding to positions of threaded holes in unbroken anchoring tabs. The threaded holes are used to connect the frame member to a manhole cover by threaded bolts extending through the cover and into the threaded holes. Expansible actuators are mounted to the frame member and are capable of moving a part of the expansible bracket outward into engagement against the inner wall of the base or a sleeve or casing attached to the base.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose.

DETAILED DESCRIPTION OF THE INVENTION

The purpose of a repair bracket of the invention is to be supported within the manhole base 10 and provide threaded holes that are substitutes for the holes in one or more of the cover anchoring tabs 26. These substitute threaded holes can then be used to bolt the cover to the base when one or more of the tabs are broken off from the base. Preferably, the repair bracket seats under a shoulder, such as the underside of the lip 22 or the bottom of the base 10. Seating the repair bracket under such a shoulder tightly secures the repair bracket against being drawn upwardly when the cover bolts are tightened to secure the cover in place. The repair bracket must be outwardly expansible against the inner wall of the base or against a sleeve or casing 34 that extends below the base. The repair bracket must be held tightly enough so that it will be held in place and not fall into the manhole when the cover is placed on the base and the bolts are inserted into the threaded holes in the repair bracket. However, it is also possible to expand the repair bracket against only a vertical wall below the cover without seating it under a shoulder. In that case, the repair bracket needs to be secured tightly enough to prevent the repair bracket from sliding upwardly when the cover retaining bolts are tightened.

Figure 6:
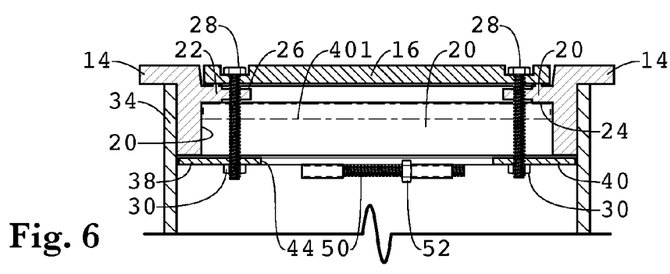
FIG. 6 is a view in vertical section showing an alternative position of an embodiment of the invention along with the manhole cover and its anchor bolts.

The preferred manhole repair bracket that embodies the invention is illustrated in FIGS. 9 through 13 and is shown in installed positions in a manhole base 10 in FIGS. 4 and 6. The repair bracket is an expansible bracket that includes a frame member 36 with a peripheral edge that follows the contour of the central passage through the manhole base 10. However, before expansion, the outer width dimensions of the frame member 36 are smaller than the central passage through the base 10 so that the expansible bracket can pass into the manhole base 10 inward of the inner wall 20 of the base and past any lip 22. After positioning within the manhole, the expansible bracket is expanded against an interior wall of the manhole base 10 or against an associated casing or sleeve 34 extending downward from the base.

The preferred frame member of the repair bracket comprises at least two crescent shaped feet 38 and 40 formed of a metal plate. The feet 38 and 40 have outer peripheral contact edges 42 that face oppositely and outwardly. The contact edges 42 are complementary to the contour of the inner wall of the base 10 or its sleeve or casing 34 so that the edges 42 are contoured to engage the inner wall 20 of the base 10 or the sleeve or casing 34 extending down below the base 10. The feet 38 and 40 also have inner edges 44 that are spaced apart to form a central access passage into the manhole. This central access passage is important because after installation of a repair bracket according to the invention, it is necessary that the appropriate service personnel continue to have access into the interior of the manhole so that it remains useful for its intended purpose.

For most manholes, both the inner wall of the base 10 or the sleeve 34 is circular. For such manhole bases, the contact edge of each foot lies along a contact line that is an arc of a circle that has the same radius as the radius of the inner wall of the base or its casing or sleeve. That arc should be less than 180° of the circle so that the feet 38 and 40 can be adjusted to pass into the manhole base 10 prior to being expanded outwardly to secure the repair bracket in place. It is also possible to form the frame member as three or more feet. In that case, the arcs should total less than 360° for the same reason. However, although these arc limitations are preferred, they are not essential if the expansible actuators (described below) that interconnect the feet have enough tolerance or "slop" to allow the feet to be moved together and overlap before the feet are forced apart for supporting the expansible bracket in the manhole.

Threaded holes 46 are formed transversely through the frame member 36 and are located at positions corresponding to the positions of threaded holes in unbroken anchoring tabs of the base. In the illustrated preferred embodiment, one threaded hole is provided through each of the feet 38 and 40 by welding a threaded nut to each of the feet and drilling a larger hole coaxially with the threaded hole of each nut so a cover bolt can extend entirely through the feet 38 and 40. Of course alternatively the threaded holes can be formed only through the feet. It is important, however, that the threaded holes are aligned for connecting the frame member to a manhole cover by threaded bolts extending through the cover and into the threaded holes when the repair bracket is installed.

An expansible bracket embodying the invention also has expansible actuators 48 mounted to the frame member 36. The expansible actuators must be mounted to the frame member 36 in a manner making them capable of moving parts of the expansible bracket outward into engagement against the inner wall of the base 10 or an associated sleeve or frame 34. It is the expansible actuators that make the expansible bracket expansible.

In the preferred embodiment of invention, the expansible actuators 48 are attached to and extend between the feet 38 and 40. They are located at positions that are spaced outwardly from and on opposite sides of the access passage between the feet 38 and 40. Their purpose is to drive the feet apart and force the outer peripheral contact edges of the feet against the inner wall of the base 10 or an associated sleeve or casing 34. If there are three or more feet, the expansible actuators extend between neighboring ends of adjacent feet.

The expansible actuators 48 of the preferred embodiment each have a threaded rod 50 fixed, such as by welding, to one foot 38 so that the threaded rod 50 cannot rotate. In the illustrated embodiment, the threaded rod 50 is welded within a tube 51 that is in turn welded to the foot 38. A nut member 52 is rotatable on the threaded rod and a tube 54 is fixed to the other foot 40. The threaded rod 50 is telescopically slidable through the tube 54. The tube 54 is arranged so that the nut member 52 can be rotated on the threaded rod 50 and against the end of the tube 54 to drive the feet 38 and 40 apart. In that manner the expansible bracket is expanded and tightened against the interior of the base 10 or an associated sleeve or casing 34. Although not preferred, the internal diameter of the tube 54 can be made large enough to allow the threaded rod to be moved perpendicularly to the feet 38 and 40 so that a foot can be pivoted on the threaded rod and the feet can be slid together and overlapped.

It should be apparent from the above description of the operation of the preferred embodiment that there are alternative expansible actuators that can be applied to the invention for expanding the expansible bracket of the invention and particularly for pushing or driving apart two or more feet. The expansible actuator need only be able to force a component of the expansible connector outward as a result of moving a component of the expansible actuator, usually by rotating it. Examples of devices that can be adapted to the invention for this purpose are turnbuckles, toggles, jackscrews, worm gear screw jacks and scissors jacks. Springs could be used as expansible actuators to push the feet out against the inner wall of the base with enough force that there is sufficient frictional engagement to hold the bracket in place against the force of gravity. In particular, coil springs can be used that surround the threaded rods of the preferred expansible fasteners that are described above. Springs could also be used alone as the expansible fasteners. Using springs to supplement the illustrated expansible actuators allows the bracket to be initially retained in position and leave the installer's hands free to operate the illustrated expansible actuators (e.g. rotate the nut members 52) and move the feet more tightly against the inner wall. Springs need to exert a force that is not so large that it prevents manual movement of the feet together so the expansible bracket can be inserted into the base. But springs also need to exert a force that is large enough that the friction between the peripheral edges of the expansible bracket and the interior of the base or its associated sleeve or casing is great enough to retain the expansible bracket in the base when released by the installer. So there is a critical range of spring constants between a force that is too great to allow human hands to compress the expansible bracket and a force that is too small to support the bracket in place.

There are additional alternative constructions of embodiments of the invention. The illustrated embodiment of the invention is described above as having a contact edge of each foot that lies along a contact line. For the illustrated embodiment, the contact line and the entire contact edge are an arc of a circle. However, contact edges can be discontinuous segments that fall along the contact line. Such edges would include serrations, saw tooth edges and spaced segments such as castling. Contact edges of these forms lie along a contact line which can be arcuate, linear or other configurations that correspond to the inner walls of the manhole or associated sleeve. So it is not necessary that the entirety of a peripheral edge falls continuously along the contact line. For discontinuous contact edges, the contact line is approximately the contour of the inner wall of the base or an associated sleeve or casing. However, some teeth or segments can protrude a little more than other parts of the edge so that they will dig into the inner wall of the base. That configuration can be useful if there is no lip or shoulder against which the expansible bracket can be pulled by the cover retaining bolts.

Figure 8:
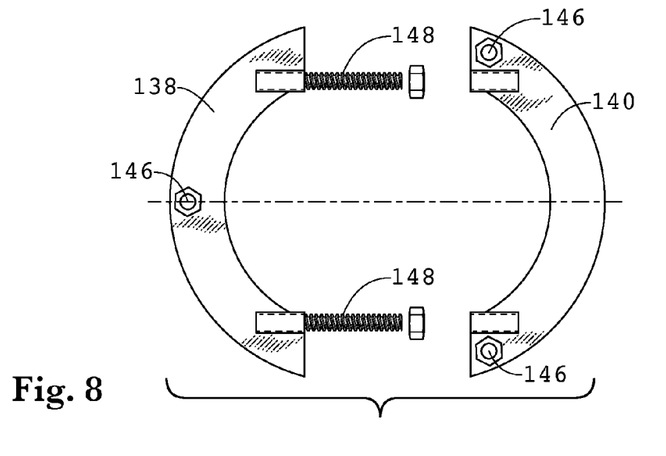
FIG. 8 is an exploded top plan view of an alternative embodiment of the invention.
Figure 9:
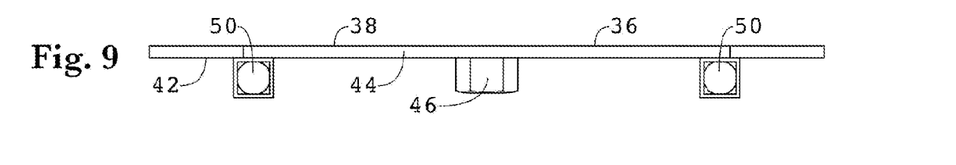
FIG. 9 is an end view of the preferred embodiment of the invention.
Figure 10:
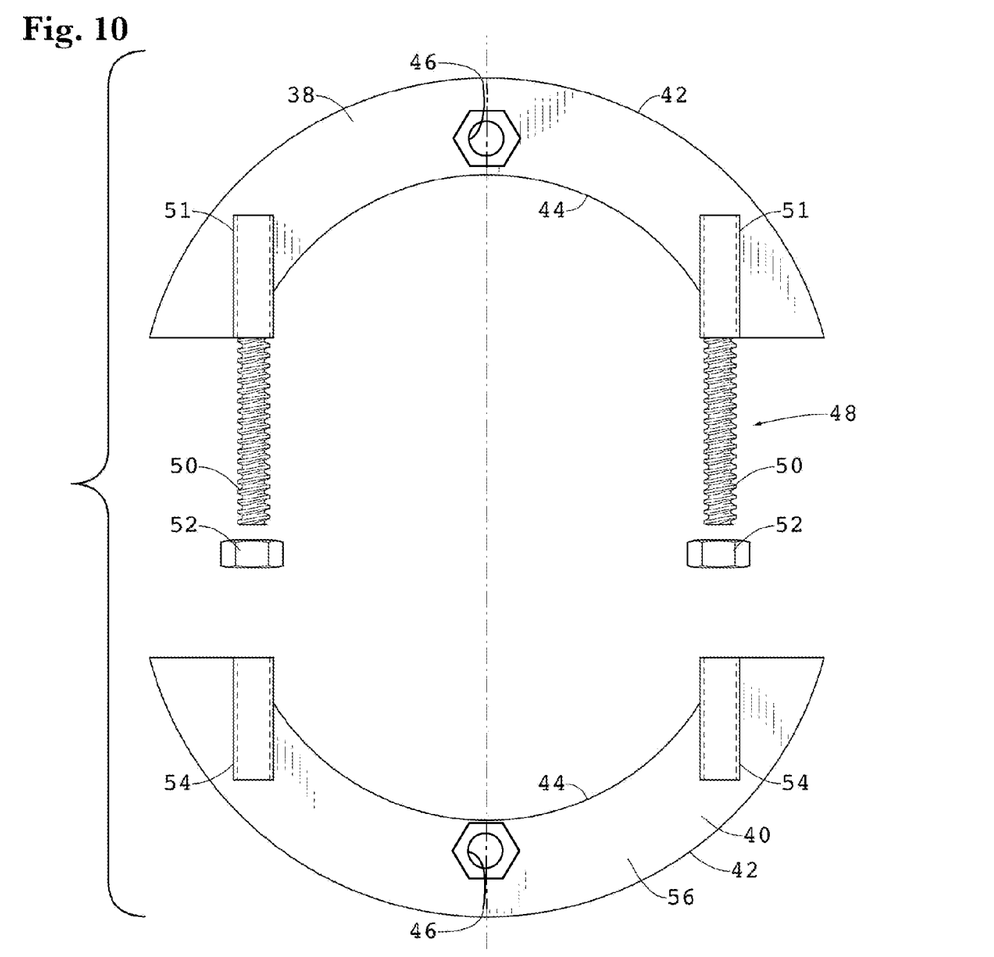
FIG. 10 is an exploded top plan view of the embodiment of the invention illustrated in FIG. 9.
Figure 11:
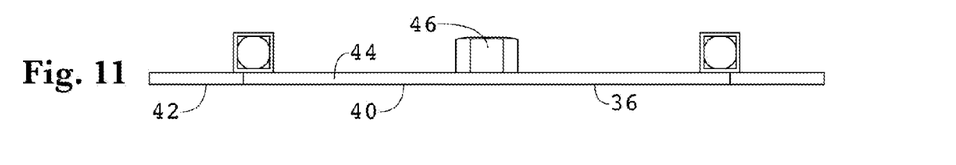
FIG. 11 is an opposite end view of the preferred embodiment illustrated in FIGS. 9 and 10.
Figure 12:
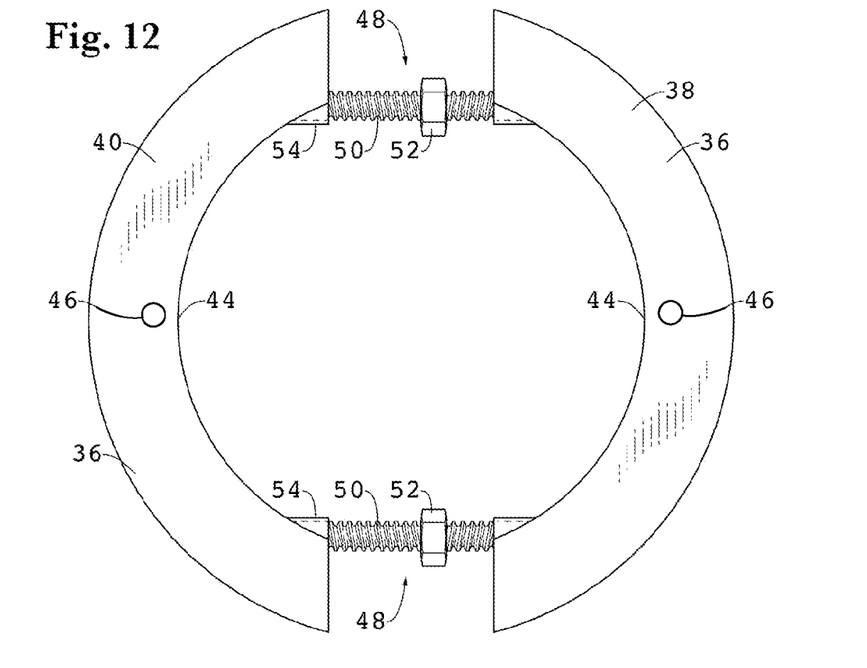
FIG. 12 is a top plan view of the assembled embodiment of the invention illustrated in FIGS. 9-11.
Figure 13:
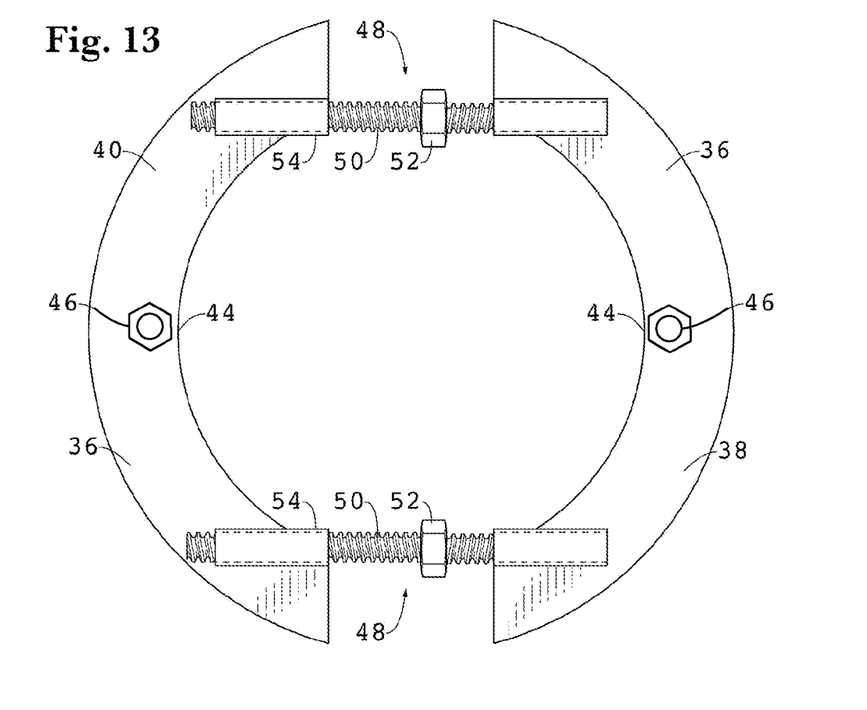
FIG. 13 is a bottom view of the assembled embodiment of the invention illustrated in FIGS. 9-12.

Alternative embodiments of the invention are illustrated in FIGS. 8, and 14-16. FIG. 8 shows an expansible bracket constructed according to the invention for use with a round cover having three equiangularly spaced bolt holes. The expansible bracket of FIG. 8 is like the expansible bracket of FIGS. 9-13 having the same type of feet 138 and 140, and the same expansible actuators 148. However, instead of two threaded bolt holes, the embodiment of FIG. 8 has three threaded holes 146 that are equiangularly spaced around its center.

Figure 14:
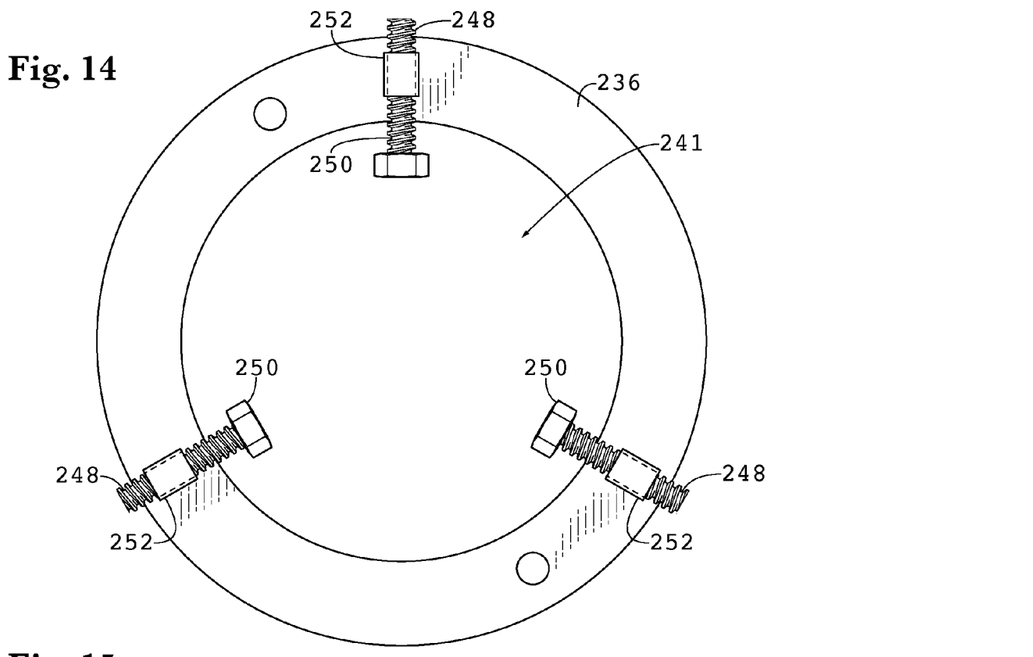
FIG. 14 is a top plan view of another alternative embodiment of the invention.
Figure 15:
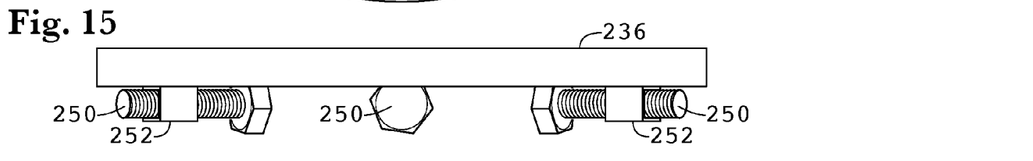
FIG. 15 is a side view of the alternative embodiment of the invention illustrated in FIG. 14.

FIGS. 14 and 15 show another embodiment having a frame member 236 that is a closed loop and more specifically is circular. The frame member 236 has three expansible actuators 248 that are equiangularly spaced around and fixed to the frame member 236. Each expansible actuator 248 is aligned to move outwardly against the inner wall of a base or against an associated sleeve or casing. The preferred expansible actuators for the embodiment of FIGS. 14 and 15 are fabricated with threaded nut members 252 fixed to the frame member 236. The nut members 252 have female threaded holes oriented along axes extending from within an access passage 241 radially outward of the frame member 236. Male threaded screws 250 are screwed into each nut member 252 and are rotatable so they move outward against the inner wall of the base or against an associated sleeve or casing thereby expanding the repair bracket.

Figure 16:
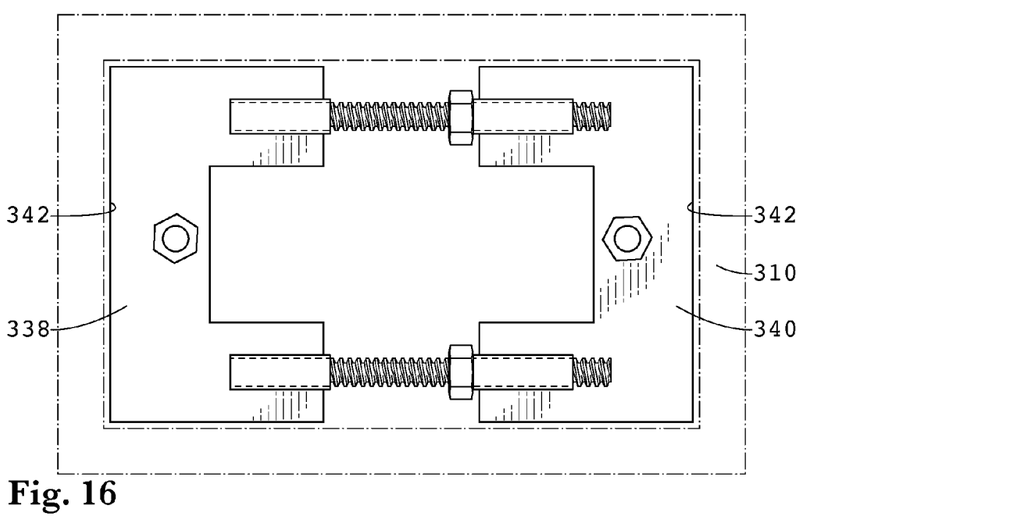
FIG. 16 is a top plan view of yet another alternative embodiment of the invention.

FIG. 16 illustrates yet another embodiment of the invention for use with a rectangular manhole base 310 and cover. It differs from the preferred embodiment of the invention by the rectangular configuration of its feet 338 and 340. The peripheral contact edges 342 of each foot 338 and 340 include a linear contact edge 342 that is parallel to the contact edge of the other foot. Those oppositely facing contact edges 342 are forced outward against the inner wall of the base 310 or against an associated sleeve or casing. For a square and rectangular base, linear contact lines are appropriate. Other contact lines of other configurations can be used for manhole bases that have other configurations.

Installation of a repair bracket according to the present invention begins with removal of the manhole cover. The assembled expansible bracket must be sufficiently compressed so that it will be able to pass through the manhole base to the desired position. The bracket is then manually lowered into the manhole base to the desired height along the central axis of the manhole base. There are a variety of positions at which the bracket can be positioned and then expanded outwardly against the interior of the base or an associated casing or sleeve.

One desirable position is immediately below lip 22 and against the downward facing surface 24 of the lip 22 as illustrated by the phantom rectangle 401 in FIG. 6. This position has the advantages that the lip 22 retains the bracket in position by preventing the bracket from being pulled upward when the cover bolts are tightened. This position 401 also accommodates relative short cover bolts.

Another desirable position of the bracket is immediately below the bottom of the base 10 as illustrated in FIG. 6 with the feet 38 and 40 seating up against the bottom of the base 10. This position has the advantages that the bottom of the base 10 retains the bracket in position by preventing the bracket from being pulled upward when the cover bolts are tightened. This position requires relatively longer cover bolts.

Figure 7:
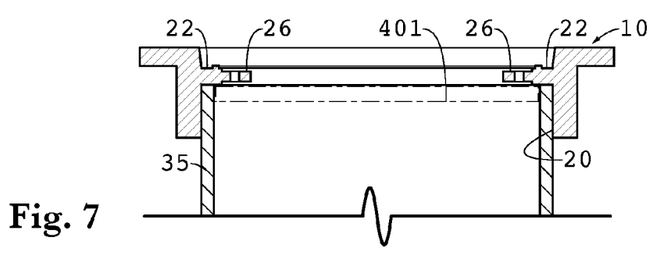
FIG. 7 is a view in vertical section taken substantially along the line 6-6 of FIG. 3 illustrating the prior art base with an alternative position for an embodiment of the invention.

FIG. 7 illustrates a manhole base with a sleeve or casing 35 that is telescopically positioned within and against the inner wall 20 of the base 10. With the FIG. 7 arrangement, the bracket cannot be positioned up against the bottom of the base 10 so it is preferably positioned at the position 401 immediately below the lip 22.

While being held in position, the bracket is expanded outward by operation of the expansible actuators until it seats against the inner walls of the base or an associated sleeve or casing. However, before the bracket is securely tightened, the frame member is rotated so that the threaded holes are angularly offset from the holes in the tabs to provide clearance for the bolts that are to be inserted through the cover into the threaded holes in the bracket. The amount of offset must be sufficient so that any remaining tabs or portion of broken tabs do not interfere with the bolts. The threaded holes in the frame member have the same angular spacing as the threaded holes in the original tabs which is typically 180° or 120°.

The frame member can be spaced below, and without contacting, the underside of the lip or the bottom of the base so that it engages the inner walls of the base or an associated sleeve or casing only by friction. Although that is possible, such a position loses the additional retention from the lip or bottom of the base. However, if there is sufficient expansive tightening, especially if the holding power is assisted by protrusions along the peripheral edge of the frame member, such an installation is operable.

Finally, it should now also be apparent from the above description that it is necessary that the expansible bracket of the invention must be structurally formed and adapted, and sufficiently rigid, that it will not be bent upward beyond its elastic limit by normal tightening of the cover bolts. Otherwise, excessive bending or distortion of the expansible bracket could pull the expansible bracket out of contact with the manhole base and permit removal of the bracket and the cover from the base.

REFERENCE NUMERAL TABLE

10 manhole base
12 opening in base
14 outwardly extending flange on base
16 cover of base
18 recessed ledge to support cover
20 inner wall of base
22 lip
24 downward facing surface of lip
26 cover anchoring tabs
28 threaded bolts to attach cover
30 tapped holes through tabs
32 well
34 casing or sleeve
35 casing or sleeve (FIG. 7)
36 frame member
38 foot
40 foot
42 outer peripheral contact edge of feet
44 inner edges of feet
46 threaded holes through frame/feet
48 expansible actuator
50 threaded rod of expansible actuator
52 nut member of expansible actuator
54 tube of the expansible actuator
138, 140 feet (FIG. 8)
146 holes (FIG. 8)
148 expansible actuator (FIG. 8)
236 frame member (FIGS. 14, 15)
248 expansible actuators (FIGS. 14, 15)
250 male threaded screws (FIGS. 14, 15)
310 manhole base (FIG. 16)
338 foot (FIG. 16)
340 foot (FIG. 16)
342 contact edge (FIG. 16)
401 a position of the bracket This detailed description in connection with the drawings is intended principally as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of the following claims.

The invention claimed is:

1. A repair bracket attached to a manhole cover and to a manhole base, the repair bracket providing a substitute for one or more broken anchoring tabs of the base, the base including an inner wall surrounding a central passage through the base, the repair bracket comprising:

an expansible bracket having a peripheral edge following the central passage contour but having outer width dimensions smaller than the central passage so the expansible bracket can pass into the manhole base and be positioned inward of the inner wall, the expansible bracket further including,
(i) a central manhole access passage through the expansible bracket that permits access into the manhole;
(ii) threaded holes transversely through the expansible bracket and located at positions corresponding to positions of threaded holes in unbroken anchoring tabs of the base, the threaded holes having threaded bolts connecting the expansible bracket to a manhole cover by extending through the cover and into the threaded holes when the expansible bracket is in an expanded position; and
(iii) expansible actuators mounted to the expansible bracket and capable of moving a part of the expansible bracket outward into engagement against the inner wall of the base or a sleeve or casing attached to the base.

2. A repair bracket according to claim 1, wherein
(a) the expansible bracket comprises at least two feet, each foot having an outer peripheral contact edge contoured to engage the inner wall of the base, the contact edges facing oppositely outwardly, the feet also each having inner edges that are spaced apart to form the central access passage;
(b) the threaded holes are through the feet; and
(c) the expansible actuators are attached to and extend between the feet at positions that are spaced outwardly from and on opposite sides of the access passage for forcing the feet apart and their outer peripheral contact edges against the inner wall of the base or a sleeve or casing attached to the base.

3. A repair bracket according to claim 2 wherein the contact edges of the feet lie along contact lines that have a contour that is complementary to the contour of the inner wall of the base or a sleeve or casing attached to the base.

4. A repair bracket according to claim 3 wherein the contact edge of each foot includes a linear contact edge that is parallel to the contact edge of the other foot.

5. A repair bracket according to claim 3 wherein the inner wall of the base is circular and the contact edge of each foot includes a contact edge lying along a contact line that is an arc of a circle that has the same radius as the radius of the inner wall of the base and is less than 180° of the circle.

6. A repair bracket according to claim 5 wherein the feet have crescent shapes.

7. A repair bracket according to claim 6 wherein there are two feet each having oppositely directed crescent shapes.

8. A repair bracket according to claim 7 wherein the expansible actuators each include a threaded rod fixed to one foot and a nut member rotatable on the threaded rod.

9. A repair bracket according to claim 8, wherein the expansible actuators each further comprise a tube fixed to a foot and having a threaded rod slidable through the tube, the tube being fixed to a foot to allow the nut member to be tightened against the tube and drive the feet apart.

10. A repaired manhole base and cover comprising:
(a) a manhole base having a lip that protrudes inwardly from an inner wall surrounding a manhole passage through the base, the base having originally had at least two anchoring tabs that extended inwardly from the base with threaded vertical holes for bolting the cover to the base, at least one of said anchoring tabs being broken away; and
(b) an expansible bracket having a peripheral edge following the central passage contour but, prior to installation, having outer width dimensions smaller than the central passage so the expansible bracket can pass into the manhole base and be positioned inward of the inner wall, the expansible bracket further including,
(i) a central manhole access passage through the expansible bracket that permits access into the manhole;
(ii) threaded holes transversely through the expansible bracket and located at positions corresponding to positions of threaded holes in unbroken anchoring tabs of the base, the threaded holes having threaded bolts extending through the cover and into the threaded holes when the expansible bracket is in an expanded position; and
(iii) expansible actuators mounted to the expansible bracket and forcing a part of the expansible bracket outward into engagement against the inner wall of the base or a sleeve or casing attached to the base and beneath the lip.

11. A repaired manhole base and cover according to claim 10, wherein
(a) the expansible bracket comprises at least two feet, each foot having an outer peripheral contact edge contoured to engage the inner wall of the base or a sleeve or casing attached to the base, the contact edges facing oppositely outwardly, the feet also each having inner edges that are spaced apart to form the central access passage;
(b) the threaded holes are through the feet; and
(c) the expansible actuators are attached to and extend between the feet at positions that are spaced outwardly from and on opposite sides of the access passage for forcing the feet apart and their outer peripheral contact edges against the inner wall of the base or a sleeve or casing attached to the base.

12. A repaired manhole base and cover according to claim 11 wherein the contact edges of the feet lie along contact lines that have a contour that is complementary to the contour of the inner wall of the base or a sleeve or casing attached to the base.

13. A repaired manhole base and cover according to claim 12 wherein the contact edge of each foot includes a linear contact edge that is parallel to the contact edge of the other foot.

14. A repaired manhole base and cover according to claim 12 wherein the inner wall of the base is circular and the contact edge of each foot includes a contact edge lying along a contact line that is an arc of a circle that is less than 180° and that has a radius that is the same as the radius of the inner wall of the base or a sleeve or casing attached to the base.

15. A repaired manhole base and cover according to claim 14 wherein the feet have crescent shapes.

16. A repaired manhole base and cover according to claim 15 wherein there are two feet each having oppositely directed crescent shapes.

17. A repaired manhole base and cover according to claim 16 wherein the expansible actuators each include a threaded rod fixed to one foot and a nut member rotatable on the threaded rod.

18. A repaired manhole base and cover according to claim 17, wherein the expansible actuators each further comprise a tube fixed to a foot and having a threaded rod slidable through the tube, the tube being fixed to a foot to allow the nut member to be tightened against the tube and drive the feet apart.

19. A repaired manhole base and cover according to claim 10, wherein
    (a) the expansible bracket is a closed loop; and
    (b) the expansible actuators comprise at least three expansible actuators spaced around and fixed to the expansible bracket and aligned to move outwardly against the inner wall of the base or a sleeve or casing attached to the base.

20. A repaired manhole base and cover according to claim 19 wherein the expansible actuators comprise:
    (a) threaded nut members fixed to the expansible bracket and having female threaded holes oriented along an axis extending from within the access passage outward of the expansible bracket; and
    (b) a male threaded screw in each hole and rotatable outward against the inner wall of the base or a sleeve or casing attached to the base.

* * * * *